United States Patent [19]

Akerlow et al.

[11] 4,098,685
[45] Jul. 4, 1978

[54] APPARATUS AND METHOD FOR SEPARATING LEAD BATTERY MATERIALS

[75] Inventors: Earl V. Akerlow, Grafton; Kenneth M. Buchholz, Milwaukee, both of Wis.

[73] Assignee: Akerlow Industries, Inc., Grafton, Wis.

[21] Appl. No.: 757,173

[22] Filed: Jan. 6, 1977

[51] Int. Cl.² .............................................. B07B 1/24
[52] U.S. Cl. ...................................... 209/10; 209/248; 209/270; 209/294; 209/297
[58] Field of Search ................... 209/17, 172.5, 172, 209/270, 288, 289, 293, 294, 297, 250, 243, 247, 248, 284, 10, 295; 241/20, 24

[56] References Cited

U.S. PATENT DOCUMENTS

| | | | |
|---|---|---|---|
| 1,254,873 | 1/1918 | Wulff | 209/248 |
| 1,587,623 | 6/1926 | Zuckerman | 241/20 |
| 2,286,132 | 6/1942 | Walle | 209/270 |
| 2,670,078 | 2/1954 | Davis | 209/172 |
| 3,028,962 | 4/1962 | Davis | 209/172.5 |
| 3,614,003 | 10/1971 | Tremolada | 241/79.3 |
| 3,892,563 | 7/1975 | La Point | 209/172.5 X |
| 4,018,675 | 4/1977 | Petrucci | 209/295 X |
| 4,026,477 | 5/1977 | Tremolada | 209/172.5 X |

*Primary Examiner*—Bernard Nozick
*Assistant Examiner*—Ralph J. Hill
*Attorney, Agent, or Firm*—Wheeler, Morsell, House & Fuller

[57] ABSTRACT

Lead battery components such as metallic grids and paste are fed into a tumbling drum which has inlet and outlet ends and an intermediate region in which there are screens for the fine particles of paste to discharge to the exterior of the drum. Water is sprayed onto the plates in the drum. A shroud or housing surrounds the region of the drum containing the screens. Means are provided to create subatmospheric air pressure in the shroud and, consequently, in the drum. The slurry of paste particles is collected in a tank which is integral with the bottom of the shroud. The slurry is passed through a cyclone separator and the water extracted by the separator is recirculated through the lines which supply the spray nozzles. All openings in the drum are subjected to subatmospheric pressure.

1 Claim, 8 Drawing Figures

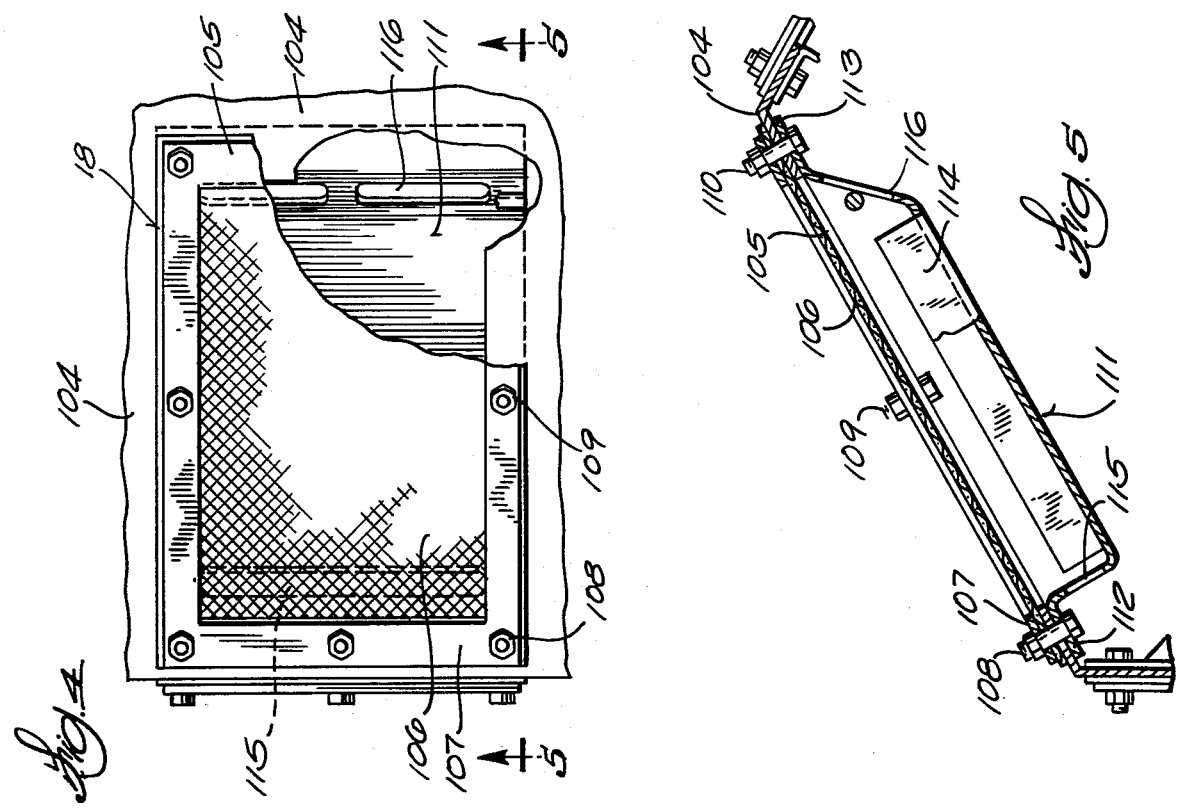
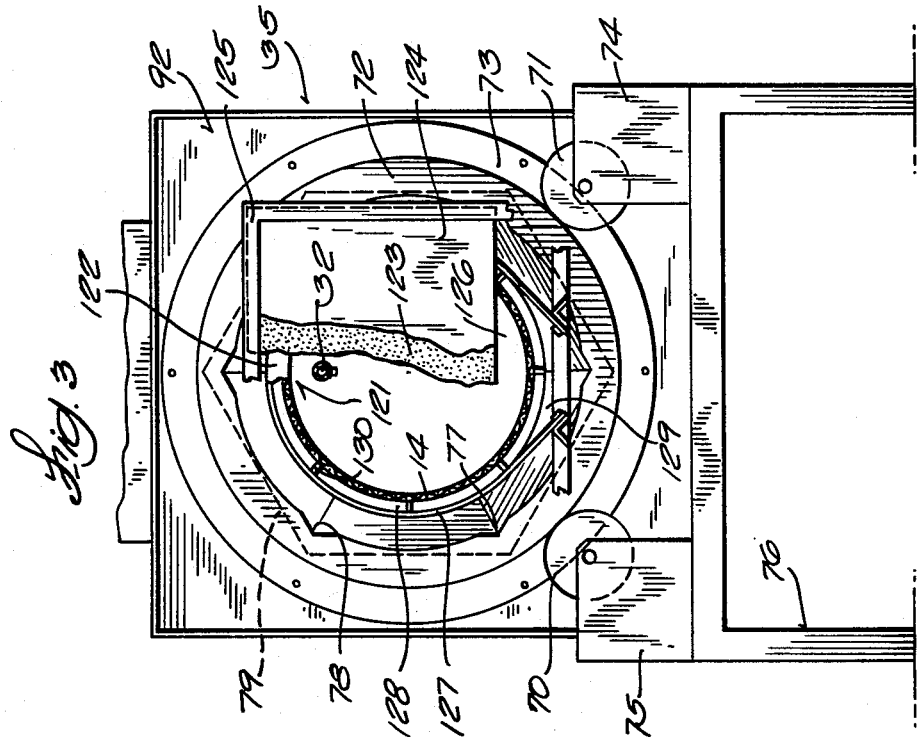

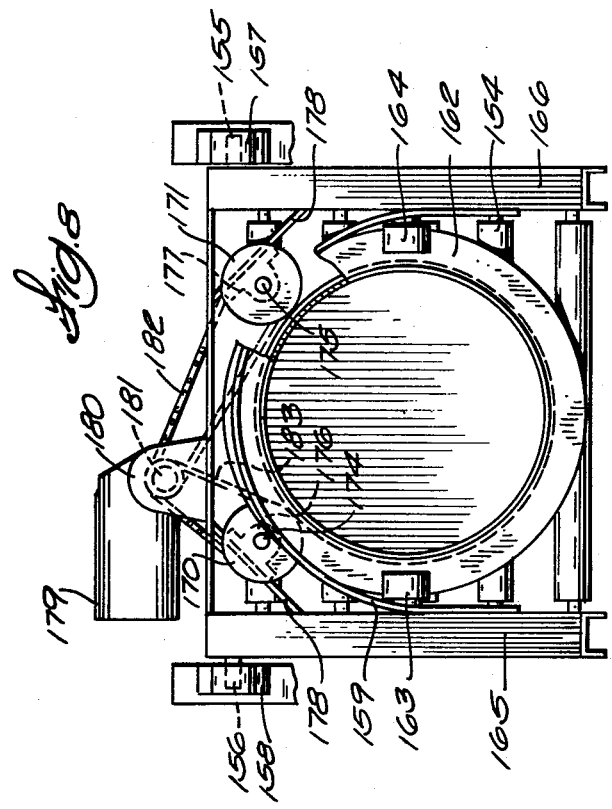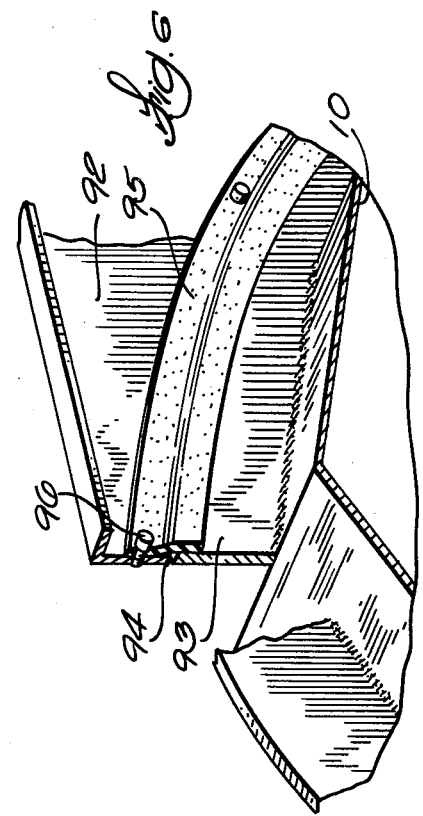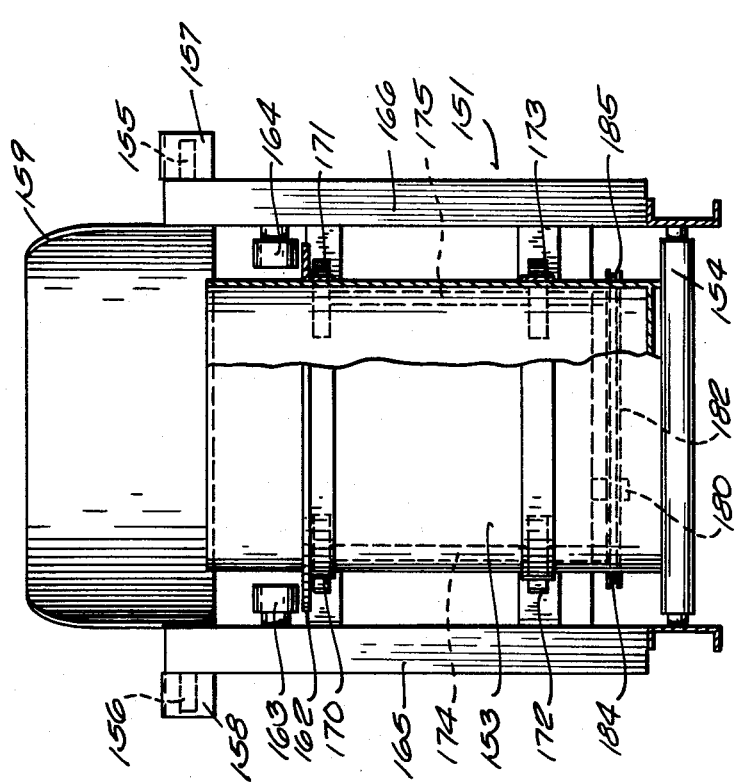

APPARATUS AND METHOD FOR SEPARATING LEAD BATTERY MATERIALS

BACKGROUND OF THE INVENTION

This invention relates to a method and apparatus for separating and reclaiming lead oxide and metallic grid materials which compose plates such as are used in lead-acid storage batteries. As is well known, in the manufacture of battery plates, one type of lead oxide compound is pressed onto metallic grids for positive plates and another type of lead oxide compound is pressed onto grids for negative plates in a battery. Some of the grids inevitably come off of the pasting line with defects such as with pits in the paste or with corners which are not covered with paste. Since the plates have not been immersed in battery acid up to this time it is possible to remove the positive and negative oxide pastes from the grid and return the plates to the negative paste mixer for reuse in further production.

Manufacturers have used various methods for separating the paste from the grids. One method involves laying the defective grids out on a screen which is over a vat and then washing the paste off of the grids with a hose. Most of the water is then separated from the slurry formed in the vat and the residual paste is returned to the process. Another method involves putting the plates in a drum which is supplied with water and tumbling the plates for about an hour to knock off the paste. The mixture of oxide slurry and metallic grid material is then spilled onto a screen to sift the paste particles from the grid scrap.

Known methods for reclaiming the components of battery plates are detrimental to the comfort, safety and health of those who are required to perform the method. There is always water containing lead oxide particles in the working environment due to spilling and splashing that is incidental to the method. Lead compounds are known to be hazardous to health. Even though the workers wear waterproof clothing, lead compounds deposit on them and expose them to the danger of lead poisoning. An even greater health hazard results from lead oxide particles inevitably becoming airborne even though the environment and the materials are kept wet. The size of the lead oxide particles is believed to range between 0.1 microns and 0.5 microns with most particles being below 0.3 microns although some are even smaller than 0.1 microns. These small particles are readily entrained by gas and vapor molecules in the atmosphere. Inhalation of lead compounds is even more detrimental to health than skin contact. Some workers exhibit the symptoms of lead poisoning after a very short exposure to such environment.

Besides being detrimental to health, prior methods of reclaiming the paste and grids from the battery plates are uneconomical and especially unsuitable for use in a high production plant where even a small percentage of rejects results in a substantial volume of plates to be reclaimed.

SUMMARY OF THE INVENTION

In accordance with the invention a method and apparatus is provided for reclaiming battery plates and for recycling of reusable materials. The new method and apparatus have the advantage of high productivity without the disadvantages of worker discomfort and hazardous environmental contamination. The apparatus for performing the method comprises a drum which is mounted for rotation about a substantially horizontal axis. The drum has an inlet at one end for lead oxide coated battery plates and an outlet at the other end for lead grid material from which the oxide has been removed. A portion of the drum interior intermediate the inlet and outlet ends is provided with specially designed screens located at two different stages in the wall of the drum. In the first screen stage, the combined effect of water which is sprayed on the plates and tumbling of the plates results in most of the oxide material being separated from the metallic grid material. This slurry of oxide paste is separated by the screens and the grid material bearing a small residual of oxide is advanced to the second intermediate stage where it is further tumbled and washed to remove substantially all of the residual oxide paste. The grid material is then advanced to a dryer stage at the outlet end of the drum. This stage has a discharge opening for lead solids and it also has screens through which air is drawn to promote the drying process. The exterior of the drum in the region of the intermediate screen stages is surrounded by a shroud in the bottom of which a slurry tank is formed. A suction fan is coupled to the shroud to cause subatmospheric pressure in the shroud which pressure is communicated to the interior of the drum through the intermediate stage screens. Subatmospheric pressure in the drum prevents the outflow of contaminated air.

The screens in the intermediate stages have holes of particular sizes and spacing which results in their passing agglomerates of a predetermined maximum size and a distribution of particle sizes which, when the slurry is transferred to a cyclone separator, results in maximizing the efficiency of the separator.

Means are provided for recirculating and reusing the process water and the system is so designed that use of make-up water is minimized.

Unique apparatus is also provided for feeding the battery plates into the drum. The feed apparatus comprises a holder which is adapted to receive from a conveyor successive barrels of battery plates destined for reclaiming. Means are provided for pivoting the holder on its support structure to pour the contents of the barrel progressively at different angles to the feed chute at the inlet of the drum which is also subjected to subatmoospheric pressure so air contaminants will be drawn inwardly. The apparatus is programmed so that each feed barrel is angulated a predetermined amount and rotated to discharge some of its contents and this is followed by further angular increments and rotation which finally results in the feed barrel being nearly inverted and emptied. The overall effect is a continuous reclaiming process with intermittent feed of materials.

As implied above, some of the general objects of the present invention are to provide a battery plate reclaiming method and apparatus which performs automatically to rapidly and effectively separate paste materials from grid materials.

Another object is to provide apparatus in which all fluids and solids are confined and wherein atmospheric pollution is substantially eliminated, this object being achieved in part by subjecting all openings in the apparatus to negative or subatmospheric pressure.

Still another object is to use the inrush of air resulting from the interior of the drum being at subatmospheric pressure to dry the grid material before it is discharged from the apparatus.

Yet another object is to teach the optimum size and spacing of holes in screens used in the apparatus for separating the slurry of particulate paste materials from the lead grid material such that the slurry composition may be most effectively handled by a cyclone type separator.

A further object is to provide a shroud or enclosure for a portion of the drum in which subatmospheric pressure may be developed for transmission to the drum and which should also serve as a slurry collection tank.

Other objects are to provide automatic feeding equipment for the apparatus and to provide for further purification of the air before it is discharged from the apparatus to the atmosphere.

How the foregoing and other more specific objects of the invention are achieved will appear in the ensuing description of a preferred embodiment of the invention in which reference is made to the accompanying drawings.

DESCRIPTION OF THE DRAWINGS

FIG. 3 is an elevational view of the outlet end of the drum assembly shown in the preceding figure, some parts being broken away, this view being taken on a line looking in the direction of the arrows 3—3 in FIG. 2;

FIG. 4 is a plan view of one of the screen assemblies which is installed in the wall of the tumbling drum as seen from the exterior of the drum;

FIG. 5 is a section taken on a line corresponding with 5—5 in FIG. 4;

FIG. 6 is an enlarged fragmentary and partially sectional view of a rotary seal joint which is used to effect a seal between the tumbling drum of FIG. 2 and a shroud which surrounds a portion of the drum;

FIG. 7 is an end elevational view, with some parts omitted and with some parts in section, of a barrel lifting mechanism as seen looking in the direction of the arrows 7—7 in FIG. 2; and FIG. 8 is a plan view of the barrel lift mechanism with some parts omitted and others shown fragmentarily and in section.

DESCRIPTION OF A PREFERRED EMBODIMENT

Figure 1:
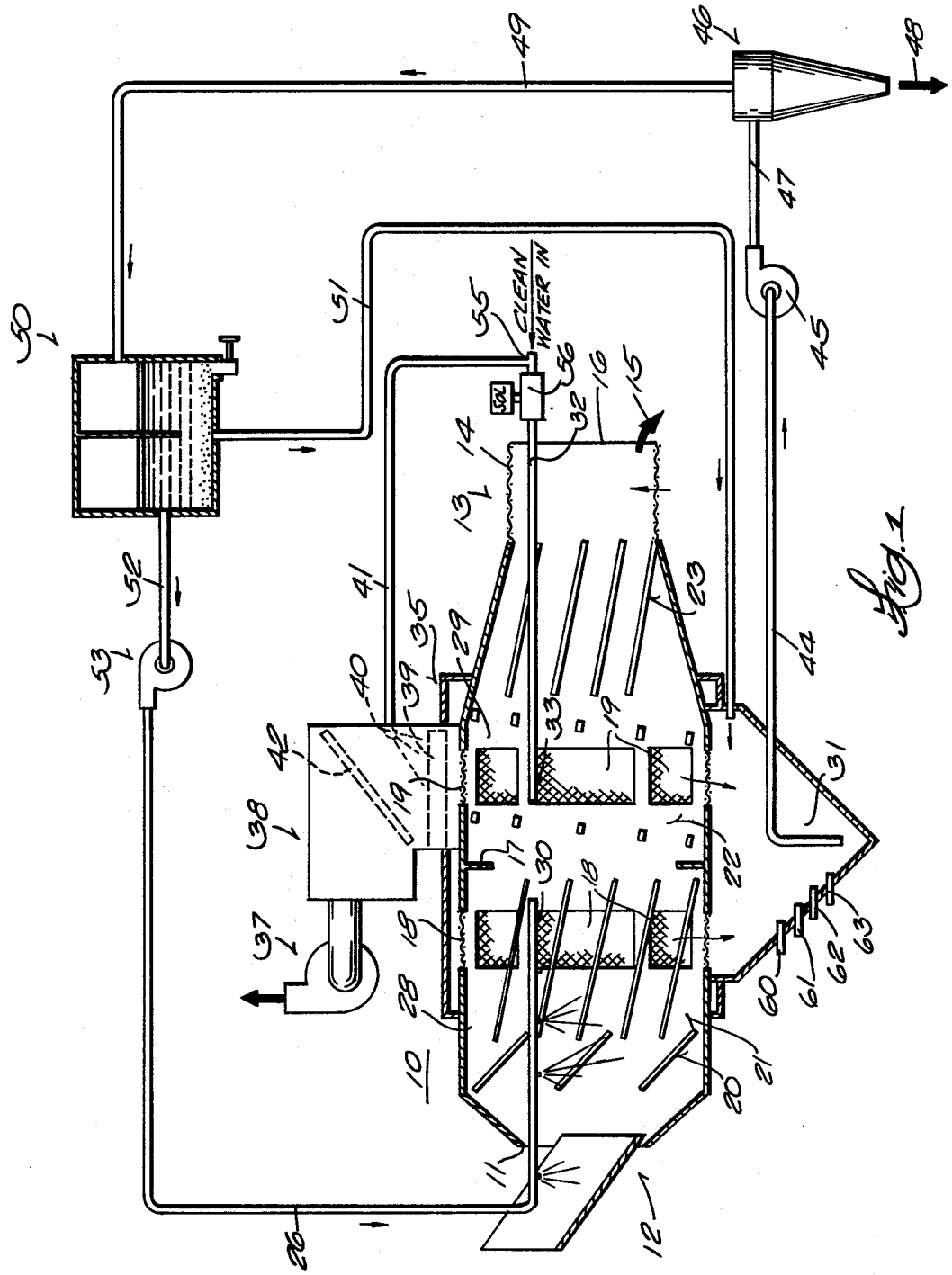
FIG. 1 is a schematic diagram showing the principal features of a system for separating battery plate grid and paste materials.

The main features of an entire system for separating the lead oxide paste and grid materials of battery plates will be outlined in reference to FIG. 1. In this figure, there is an elongated tumbling drum which is generally designated by the reference numeral 10. The drum has an inlet opening 11 at one end. Battery plate materials which are to be reclaimed are fed into the drum through a chute 12. Lead scrap from which oxide materials have been removed in the tumbling drum are advanced axially away from the inlet end to outlet means which are generally designated by the reference numeral 13. The outlet means constitutes a dryer section or stage which has a screen 14 in its periphery to permit inrushing air to dry the lead scrap material before it is discharged. The arrow 15 is to indicate that the scrap grid material exits through a port in the end 16 of this stage.

The interior of drum 10 in the region intermediate of its inlet and outlet ends is divided into two main stages 28 and 29 by an internal ring 17. To the left of ring 17 in FIG. 1 the tumbling drum has in its periphery a set of screens such as those marked 18 and it has another set of screens such as those marked 19 on the axially opposite side of the ring. Ring 17 serves as a dam for restricting axial movement of the battery plates long enough for most of the oxide material to be washed from the grids in the stage 28 to the left of the ring before the solid materials are advanced to the final washing stage 29 at the right of the ring after which the fragmented solid grid materials progress toward the outlet means 13 of the drum.

Materials fed into the rotating drum 10 are tumbled and advanced axially from the inlet toward the outlet end with several sets of angulated blades or lifters such as the sets marked 20-23. Lifters 20 are in a tumbling region, lifters 21 and 22 are in consecutive washing regions and lifters 23 are in a drying region.

The first main stage 28 in the tumbling drum in which most of the lead oxide material is knocked off of the lead grid material, has a water input header 26 in which there are several nozzles 27 for spraying water onto the materials in the drum. The resulting slurry of water and lead oxide particulates passes out of the drum through the set of screens 18 and is collected in a slurry tank or sump 31. The fragmented lead grid material, which has some residual lead oxide material on it, is washed further in the next stage 29 and the more dilute slurry thus formed passes through screens in the second set 19 and into tank 31. A pipe 32 extends into the drum 10 and it has one or more nozzles such as 33 for spraying clean water on the materials in the second main stage 29.

The central region of drum 10 intermediate inlet and outlet ends 11 and 13 is surrounded by a schematically represented stationary shroud which is designated generally by the reference numeral 35. Sealing means, not shown in FIG. 1 but which will be discussed later, are interposed between stationary shroud 35 and drum 10 so that the drum is free to rotate while the interior of the shroud is isolated from direct communication with the atmosphere surrounding the drum.

During operation of the apparatus, the interior of shroud 35, sump 31 and drum 10 are maintained in a state of subatmospheric pressure with a suction fan 37. The inlet of the suction fan is coupled to a plenum chamber 38 in which subatmospheric air pressure is developed and from which it is communicated to the interior of shroud 35 and, through the sets of screens 18 and 19, to the interior of drum 10. Fine solids which are entrained in the air that is withdrawn from the shroud 35 by the suction are captured in a filter bed 39. The filter bed is washed off continually with water emitted from a spray nozzle 40 which is supplied from a pipe 41. The washed off solids are returned to slurry tank 31. There is also a demister 42 in plenum chamber 38 for removing mist before the air is discharged to the atmosphere from the outlet of suction fan 37.

The slurry of lead oxide and water which collects in slurry tank 31 is withdrawn from the tank through a pipe 44 that is connected to the inlet of a pump 45. The outlet of pump 45 connects to an inlet of a cyclone separator 46 with a pipe 47. By way of illustration, the slurry fed to the cyclone separator will usually be comprised of about 20% of lead oxide solids and 80% water. The size of the solid particulates which accumulate in slurry tank 31 and which are fed to the cyclone separator as a slurry is governed to a large extent by the size of the holes in the screens in the set of screens 18. Optimum design characteristics of the screens which make the system function effectively will be discussed later.

Most of the lead oxide material is discharged from the bottom of the symbolically represented cyclone separator 46 in a stream indicated by the arrow 48 which material, by way of example, will usually comprise about 70% solids and about 30% water.

The major part of the water of the slurry which is fed into cyclone separator 46 is discharged with a minor amount of solids therein through an outlet line 49 which runs to a settling tank 50. Solids which precipitate or settle in the bottom of the settling tank 50 are returned to slurry tank 31 at the bottom of drum 10 through a pipe 51. Clarified water, usually having no more than two or three percent of solids entrained, is drawn from settling tank 50 through a pipe 52 to the inlet of a pump 53. The outlet of pump 53 supplies pressurized water by way of pipe 26 to the nozzles 30 in stage 28 of drum 10. It will be evident that the water circuit thus far described is essentially a closed loop which permits treating the battery plates in the first intermediate stage 28 largely with reclaimed substantially clear water.

Because some water is lost through discharge of concentrated slurry from cyclone separator 46, it is necessary to provide make-up water. An inlet point for make-up water is marked 55 in FIG. 1 and a legend indicates further where clean water is inserted. A portion of the clean make-up water is introduced into the loop by means of nozzle 33 in the second intermediate stage 29 of the drum 10. A smaller portion of the make-up water is introduced through the nozzle 40 which flushes the material collected on filter 39 into the shroud 35 and, eventually, into slurry collecting tank 31.

Solenoid valve 56 regulates flow of make-up water in response to signals derived from fluid level sensors 60-63 which are installed in slurry tank 31. The controller for regulating solenoid valve flow is not shown but can easily be devised by those skilled in the art. It is sufficient for present purposes to indicate that level sensor 61 is effective to stop fill, sensor 62 is effective to start fill and sensors 60 and 63, respectively, are for assuring high water cutoff and low cutoff.

Figure 2:
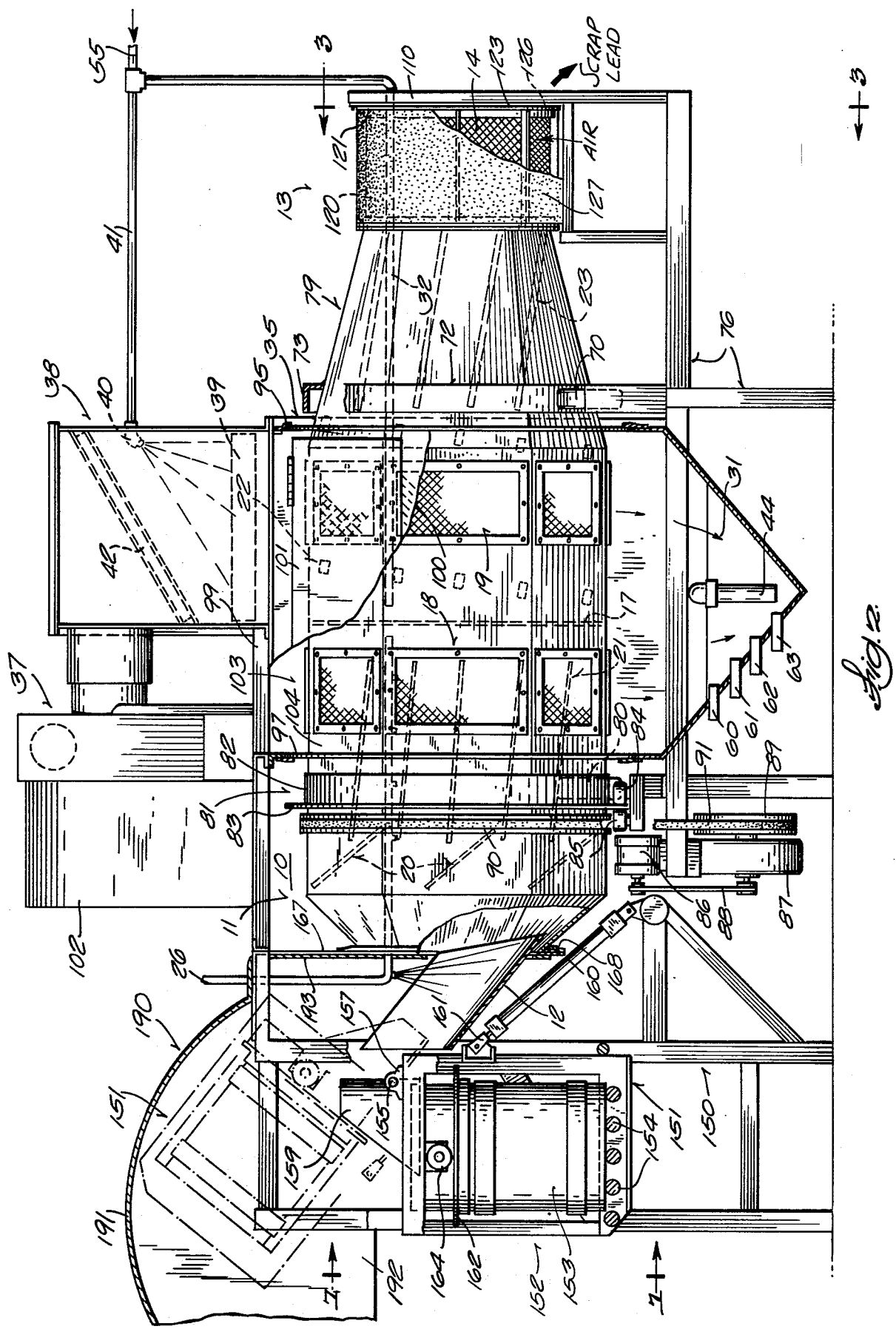
FIG. 2 is a side elevational view of a tumbling drum used in the system and some of its associated apparatus.

Attention is now invited to FIG. 2 for a more detailed description of significant features of tumbling drum 10 and its associated apparatus. The drum is basically polygonal in interior cross section and, in this example, has six flat sides. To enable the drum 10 to rotate about its axis, the drum is cradled between pairs of rubber covered rollers which pairs are axially spaced from each other. A roller 70 in one pair may be seen in FIG. 2 and the other rubber covered roller 71 in the same pair may be seen in FIG. 3. Since the exterior of drum 10 is hexagonal, a tire 72 having a smooth circular periphery 73 is welded onto the drum as can be seen in FIG. 2 and particularly well in FIG. 3. Rollers 70 and 71 in the one pair are journaled for rotation on supports 74 and 75 which are carried by a stand or frame 76. The tire 72 comprises an angle iron which is formed into a closed circle and welded at its abutting ends. As can be seen in FIG. 3, one flange of the angle iron constituting the tire has notches such as those marked 77 and 78 for the purpose of making a tight fit with the complimentarily shaped joints formed by the intersecting flat sides of the drum 10. The sides of the drum in the tapered section 79 of FIG. 2 appear in FIG. 3 as a dashed line hexagon which is also marked 79 in FIG. 3.

One of the second pair of rubber rollers is marked 80 in FIG. 2. A tire 81 mounted to the exterior of drum 10 is formed into a circle out of an angle iron such that one of its legs defines a circular peripheral surface 82 which runs on roller 80 and its mate, not shown. Tire 81 also has one of its sides 83 extending radially. Opposite faces of side 83 are captured between a pair of cam rollers 84 and 85 which prevent drum 10 from shifting axially during rotation.

The drum is driven rotationally with a motor 86 mounted on stand 76. The motor drives a speed reducer 87 through the agency of a chain and sprocket drive 88. The output shaft of the speed reducer is equipped with a v-pulley 89. A large diameter v-pulley 90 is also fitted onto the exterior of drum 10. The drum is driven by a v-belt 91 which runs on pulleys 89 and 90. In a commercial embodiment, v-pulleys having more than one groove and a correspondingly larger number of belts are used to drive the drum but only a one groove pulley system is shown in this case for the sake of simplicity.

As mentioned earlier, the central region of drum 10 is surrounded by enclosure or shroud 35 which is essentially integral with slurry tank 31 and subject to internal subatmospheric pressure. One end wall 92 of the shroud is visible in FIG. 3. A rotary seal is provided between the rotatable drum 10 and stationary wall 92. The details of the seal may be seen best in FIG. 6. The drum 10 has a radially extending flange 93 welded to it. Wall 92 has a circular aperture 94 which is a little larger than the outside diameter of flange 93. A rubber sealing ring 95 is fastened with screws 96 to wall 92. This flexible sealing ring is in resilient slidable contact relation with a side of flange 93 and, because wall 92 and flange 93 have different thicknesses, sealing ring 95 is offset to cause a sealing pressure to be generated.

A similar sealing arrangement is provided for the other end wall of shroud 35 and it employs a radially extending flange 97, shown in FIG. 2, which is similar to flange 93 and it is associated with similar sealing parts.

Shroud 35 is closed over most of its top 99 and its bottom is closed with integral sump or slurry tank 31. The shroud has a front side 100, see FIG. 2, on which a hinged access door 101 is mounted.

The plenum chamber 38 which is supported on the top of shroud 35 and whose interior communicates with the interior of the shroud has already been described in sufficient detail. The suction blower or fan 37 for creating subatmospheric pressure in plenum 38 has also been described sufficiently. The motor, not visible, for operating suction fan 37 is mounted within a protective housing 102. As mentioned in connection with the general system outline referenced to FIG. 1, stages within the drum 10 on opposite sides of dam 17 have axially spaced apart groups of screens 18 and 19 through which lead oxide entrained in water is discharged from the interior of drum 10 to slurry tank 31. A typical screen assembly marked 103 in FIG. 2 is shown in greater detail in FIGS. 4 and 5 to which attention is invited. FIG. 4 shows one of the screen assemblies as it would appear when viewed through access door 101 which also permits the exterior of the drum 10 to be observed. In FIGS. 2 and 4 one of the six wall sections comprising the hexagonal drum 10 is marked 104 and shown fragmentarily. In FIG. 5 it is evident that drum wall 104 has a rectangular opening 105 in it. A sheet of screen 106 is disposed over the opening 105 and it is held in place with a clamping frame 107 and several bolts such as those marked 108, 109 and 110. On the interior of the drum, a housing 111 is provided for protecting the screen 106 from premature destruction by reason of the heavy lead grid material falling on it during the tumbling process. The protective housing 111 has outwardly extending end flanges 112 and 113 for securing it with bolts such as 108 and 110. The ends of the housing 111 which are separated in the axial direction are mostly open except for an inwardly extending lip 114. The sides of the housing 111 have openings or slots 115, 116 and 117 for permitting lead oxide slurry to pass to the screens.

As implied earlier, experience has shown that conventional cyclone separators 46 have a propensity to plug and therefore operate at below theoretical maximum efficiency. It was discovered by the present inventors that this kind of malfunction of the cyclone separators could be mitigated by controlling the maximum size and the distribution of sizes of the slurry particulates that are fed into it from slurry tank 31. In a system such as is herein described, the lead oxide agglomerates which are separated from the lead grids in drum stage 28 will all be reduced by the mechanical action of tumbling and the dissolving action of water so that they will pass through holes of a predetermined size in the screens 106. However, in the process of reducing the size of the larger particles, a distribution or gradation of particle sizes is formed. It was discovered that the size distribution is just as important to promoting efficient operation of the cyclone separator as is maximum particle size. Hence, the screens 106 have been designed for optimizing maximum particle size and distribution. In a preferred embodiment, the sheet thickness of the punched screens is No. 18 American Wire Gage and the round holes which are 0.032 of an inch in diameter and which have a 0.055 of an inch pitch or center-to-center distance between holes as measured laterally and not diagonally. A variation of a few percent in these dimensions, however, is permissible. By using screens having the characteristics just described, cyclone separator plugging which has been such a problem in some applications became inconsequential.

Output stage 13 for drying the scrap lead grid material which has been cleaned in drum 10 and for discharging it for reuse will now be described. Referring to FIGS. 2 and 3, the output and dryer stage comprises a cylindrical chamber 120 which is connected to the conically shaped draining zone of tumbling drum 10 and rotates with it. The chamber has a radially extending flange 121 at one of its ends. The end face 122 of flange 121 may be seen in FIG. 3. This rotating flange end face 122 is one part of a rotating seal. The other part of the seal is comprised of a pliable sheet, such as a sheet of rubber 123 with which the face 122 of the flange is in sliding contact. This effectuates a seal. A metal plate 124 backs up rubber sheet 123. The plate and sheet are supported in a stationary frame 125. Note that the sheet 123 and plate 124 are dimensioned so as to create a gap 126 at the end of the chamber. The reclaimed lead scrap discharges from gap 126 as drum 10 rotates.

The cylindrical chamber 120 may have part or substantially all of its circumference occupied by screen 14. Due to subatmospheric pressure existing in drum 10, air rushes inwardly through the screen and assists in drying the lead scrap before it is discharged through gap 126. Of course, the gap is also subjected to subatmospheric pressure so that if there were any dry toxic lead containing particles liberated by mechanical action in the dryer section, they would be drawn into the drum and would not contaminate the atmosphere.

Referring further to FIGS. 2 and 3, it will be noted that rotating screen 14 is surrounded by a stationary band 127 of rubber or other pliable material which is substantially concentric with the screen 14 and defines a passage 128 around the screen. Wiper blades 130, which are fixed on the drum and rotate with it, wipe on the surface of band 127. The band is open at the bottom to provide an atmospheric air inlet 129. Atmospheric air entering inlet 129 under the influence of subatmospheric pressure in the drum enters the drum through the screen 14 portion which is presented to the inlet 129 as the drum rotates. The screen 14 does not necessarily have to extend over a major part of the dryer chamber circumference. A shorter segment of screen may be used in some cases to reduce the cross section of the air flow path and, hence, increase the velocity of the inrushing air.

The lift mechanism for pouring the contents of barrels of raw material, such as battery grids with oxide paste on them or scrap paste by itself, into drum 10 will now be described in reference to FIGS. 2, 7 and 8. Referring to the left part of FIG. 2, there is a stationary frame 150 mounted on the floor adjacent the input end of tumbling barrel 10. A barrel holder, which is referred to herein by its more descriptive name, tilting frame 151, is open on its left side 152 so that feed material barrels 153 can be transported from an adjacent conveyor, not shown, onto a platform defined by several rollers such as those marked 154. Extending from tilting frame 151 at its top are a pair of trunnion shafts 155 and 156 on which frame 151 may be tilted to a maximum angular position wherein it is represented by phantom lines in FIG. 2. Trunnion shaft 155 is visible in this figure and its counterpart, 156, may be seen in FIG. 7. The trunnions are journaled in bearing blocks 157 and 158 which are mounted to stationary frame 150. The tilting frame 151 also has a pouring spout 159 mounted on it near its top. When frame 151 is tilted and barrel 153 is rotated by a mechanism which will be described, the contents of barrel 153 are directed by stationary spout 159 into the end of chute 12. Chute 12 passes through an aperture in a stationary plate 167 which cooperates with a rotating flange 168 to form a rotating seal with drum 10.

Carriage or tilting frame 151 is angulated under the influence of a hydraulic cylinder 160 which has its piston shaft pivotally connected to tilting frame 151 with a clevis 161.

The barrel 153 must be constrained from falling off of tilting frame 151 when it is angulated. For this purpose, the barrel is provided with a radially extending circular flange 162. The flange is disposed under rollers such as 163 and 164 which are supported for rotation on side members 165 and 166 of the barrel lift tilting frame 151.

Discharge of the contents of barrel 153 is assisted by rotating the barrel when it is tilted. For this purpose the barrel is cradled between a pair of rollers 170 and 171 at an upper elevation and another pair 172 and 173 at a lower elevation. Rollers 170 and 172 are carried on a shaft 174 and rollers 171 and 173 are on a shaft 175. The shafts are journaled in pillow blocks such as 176 and 177 which are mounted, respectively, on plates 178 and 178' that are fastened to the tilting frame 151. A motor and speed reducer 179 and 180 are mounted to the frame. A sprocket 181 on the output shaft of the speed reducer drives a pair of chains 182 and 183 which engage with sprockets 184 and 185 that are fastened to shafts 174 and 175. It will be evident that when shafts 174 and 175 are rotated, there will be corresponding rotation of the rollers 170–173 which will rotate barrel 153.

A sheet metal dust cover or shield 190 is provided to confine any dust evolved when material barrels 153 are being dumped. Shield 190 has a curved top 191 and laterally spaced apart sides one of which, 192, is visible in FIG. 2. The top and sides define an open bottomed cavity in which the tilt frame 151 swings. The front panel 193 of the shield bears on plate 167 and has chute 12 passing through it. Subatmospheric pressure or suction existing in drum 10 causes any dusty air to be drawn from the interior of the shield 190 to the interior of drum 10.

In operation, the barrel lift mechanism is programmed to tilt the barrel 153 to a first angular attitude and to rotate it for a predetermined interval to cause discharge of a first quantity of battery plates and any other materials that may be in the barrel into the chute 12 of drum 10. The drum is then rotated for a predetermined interval at this first angle. The program then controls it to tilt to a second angle after a specified time and it is rotated at that angle to discharge more of the contents of the barrel. This sequence is continued until the barrel has attained its maximum angular attitude as shown in phantom lines in FIG. 2 after which it is let down to its initial position and the barrel is removed from the tilting frame to enable replacement with another similar barrel 153. The manner in which the barrel is handled as just described, results in the intermittent feed but continuous processing in tumbling drum 10 which was mentioned earlier.

Although the new apparatus and method have been discussed primarily in relation to separating and reclaiming compounds such as lead oxide from lead grid materials comprising unused battery plates, it will be appreciated that the method and apparatus may be employed to separate various lead compounds such as oxides and sulphates from the metallic lead of used battery plates as well.

Hence, although the invention has been described in considerable detail, such description is intended to be illustrative rather than limiting, for the invention may be variously embodied and used and is to be limited only by interpretation of the claims which follow.

We claim:

1. Apparatus for separating lead compound materials and metallic lead grid materials which compose the plates of lead batteries, comprising:

a drum having a wall and being mounted for rotation about a generally horizontal axis, said drum having a first end in which there is an inlet for introducing the unseparated materials into said drum and having a second end in which there is an outlet for the separated metallic lead materials to discharge from the drum, means in said drum for advancing materials introduced into said drum from its inlet end toward its outlet end and for tumbling said materials, means for spraying water into said drum and onto said materials, first and second axially spaced apart screen means in the wall of said drum, said first screen means being at a lesser distance from said inlet than said second screen means, shroud means sealingly enclosing at least the part of said drum which includes said screen means, the bottom of said shroud means being constructed and arranged as a sump for collecting the compounds and water strained through screen means, suction generating means having outlet means and having inlet means communicating with said shroud means and sump and being operative to induce subatmospheric pressure in said sump and shroud means, in said drum through said screen means and, at said inlet and outlet of said drum, dryer means immediately adjacent said drum outlet, said dryer means receiving the metallic lead material advanced from the region of said second screen means and exposing said material to the inrush of air due to said subatmospheric pressure at said drum outlet to thereby dry said material, said dryer means comprising hollow generally cylindrical screen support means including a concentric screen, said cylindrical support means being coaxial with and mounted to said drum for rotation therewith, a stationary band surrounding a major part of the circumference of said cylindrical screen support means but spaced therefrom to define an air passage outside of said screen, enclosure means including an element for producing a sliding seal relative to the end of said cylindrical support means which is most axially remote from said drum means, said enclosure means closing most of the axial end opening of said cylindrical means and leaving an opening for said metallic lead material to discharge from said dryer means.

* * * * *